Nov. 17, 1942.   K. SIEG   2,302,064
VARIABLE SPEED DRIVE
Filed July 20, 1940   2 Sheets-Sheet 1
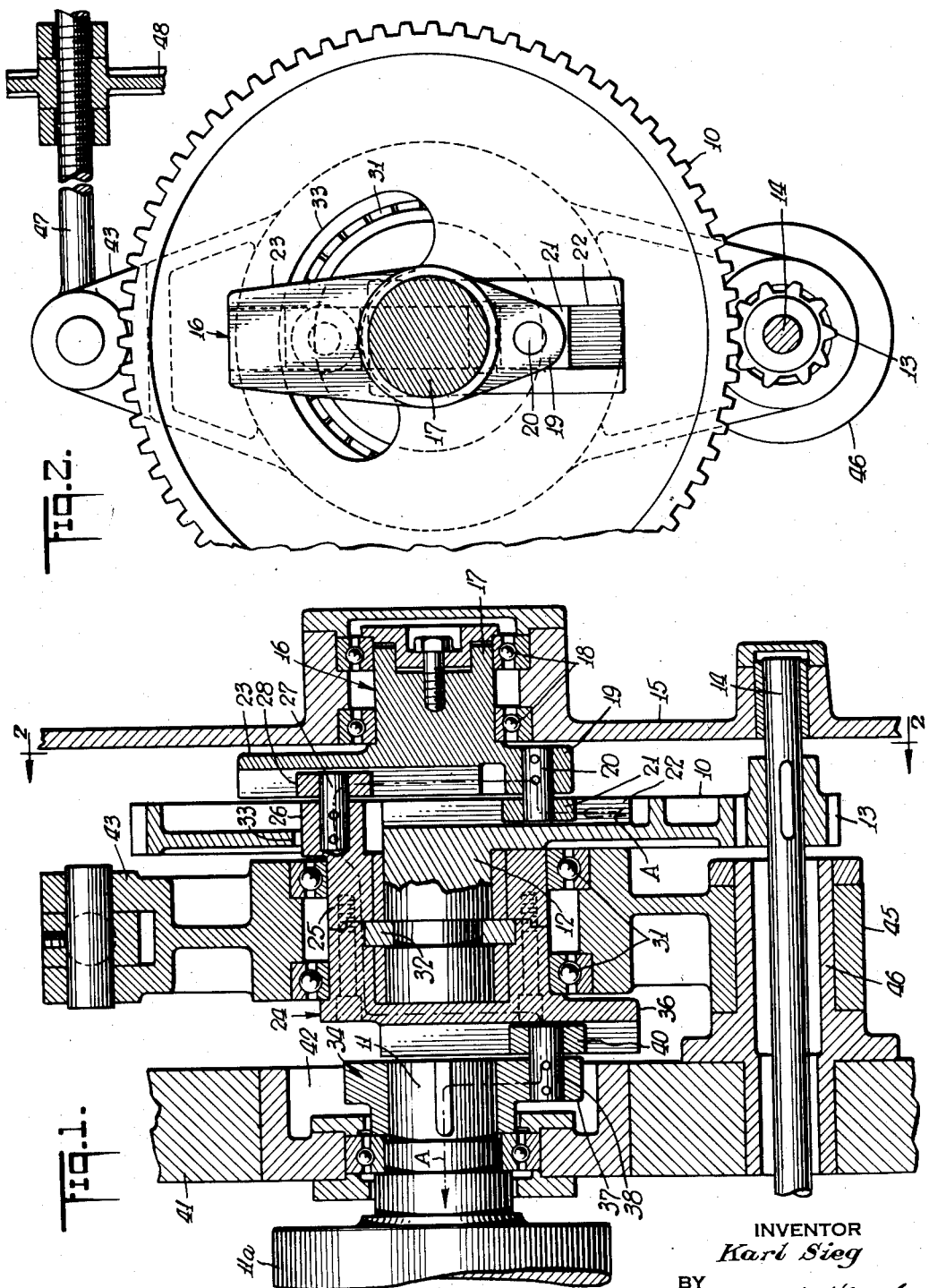
INVENTOR
Karl Sieg
BY
ATTORNEYS Nov. 17, 1942.  K. SIEG  2,302,064
VARIABLE SPEED DRIVE
Filed July 20, 1940  2 Sheets-Sheet 2
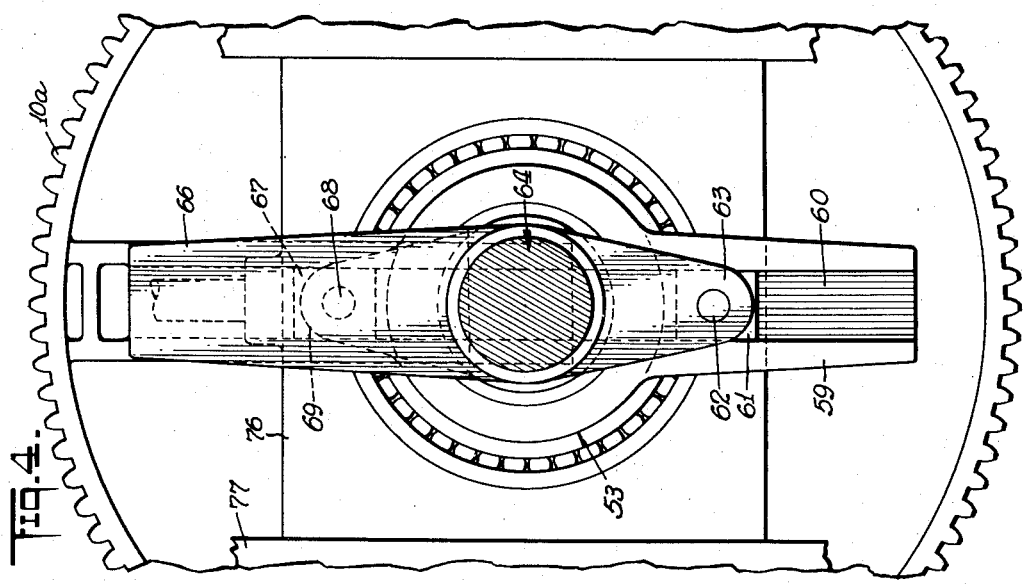
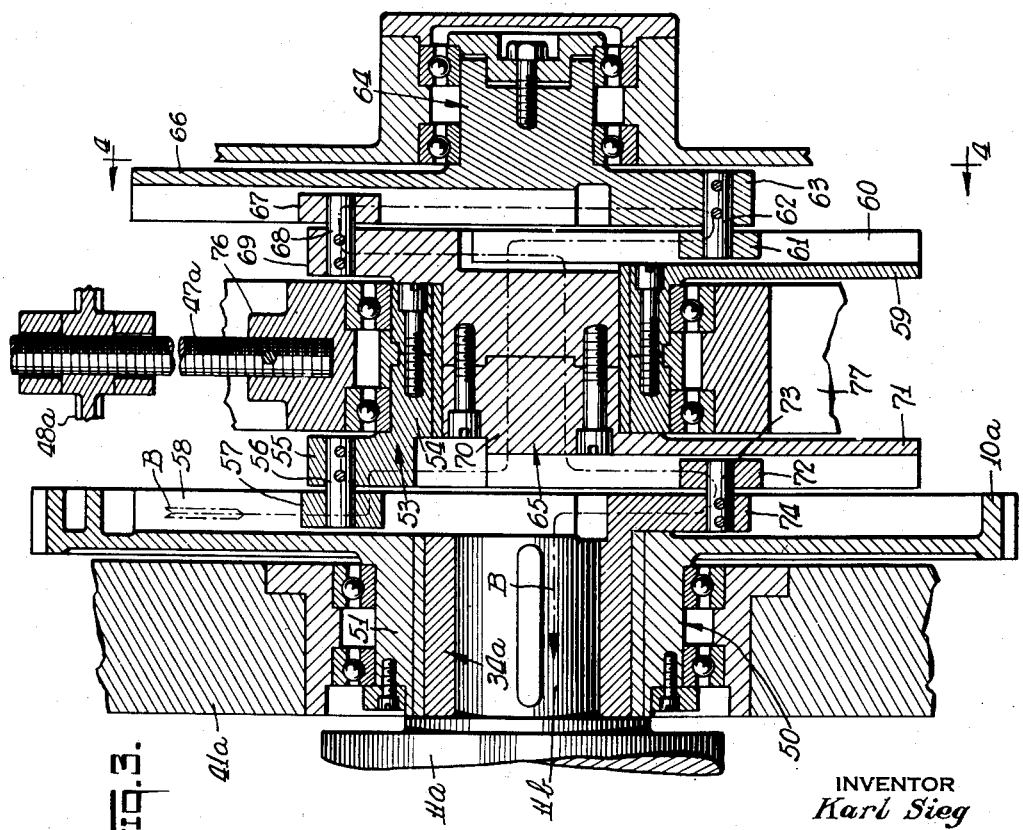
INVENTOR
Karl Sieg
BY
ATTORNEYS Patented Nov. 17, 1942

2,302,064

UNITED STATES PATENT OFFICE 2,302,064

VARIABLE SPEED DRIVE

Karl Sieg, Philadelphia, Pa., assignor to Samuel M. Langston Co., a corporation of New Jersey Application July 20, 1940, Serial No. 346,467

18 Claims. (Cl. 74—69)

This invention relates to variable speed drives of the type in which the driving member may run at uniform angular velocity, and the driven member has imparted to it alternate accelerating and decelerating speeds in its cycle. By proper adjustment, the difference between the maximum and minimum velocity of the driven member in its cycle may be varied from zero through a comparatively wide range.

My improved mechanism may be employed in a wide variety of types of machines, but merely as an example, I may mention its use in the drive of the cut-off of a machine producing comparatively stiff material, such as double faced corrugated board or fiber board. In such machines, the sheet material is delivered continuously and at a substantially uniform rate, and is cut into sections by the cut-off mechanism. In order to obtain sections of different lengths, it is necessary to adjust the total time cycle of the cut-off, so that it will make one cut for each rotation of the cut-off, or may make a plurality of cuts per rotation if the rotary cutter be provided with a plurality of knives, as in my Patent 2,177,465.

It is essential that the speed of travel of the knife at the instant of cutting be substantially the same as that of the sheet, in order to prevent tearing or buckling. An ordinary Reeves drive may be employed for varying the frequency of cutting operation, and my improved mechanism may be employed in series therewith for insuring that the rate of travel of the knife be the same as that of the sheet at the instant of cutting, regardless of the total time of the cycle, the frequency of the cuts, and the length of the cut-off sections.

In such variable speed drives, it is common practice to employ a differential crank mechanism and laterally adjust the position of the axes of the input and output members relatively to each other, whereby said axes may be in alignment, or one eccentric to the desired distance in respect to the other.

By the term "differential crank mechanism" as used in this case, I include various types of known mechanical movements such as a crank pin working in the slide of a crank arm; a crank pin on one crank arm with an aperture therethrough slidable along another crank arm; a pair of crank pins rotatable about relatively adjustable axes and connected by a link, etc.

By the term "laterally adjustable" as used in the present case, I mean that one axis may be moved out of alignment with another to a greater or less extent by a bodily movement of the rotor in a direction at right angles to its axis. Such movement may be effected by various different adjusting means or, for instance, a bearing mounted to swing about a separate fixed pivot, or a bearing slidable along a fixed guide, or a bearing encircled by an eccentric sleeve which may be rotated, or by any other equivalent mechanism.

In common practice, the extent to which the adjustment may be effected is limited to a distance substantially less than the radial distance of the crank pin from its axis of rotation.

In order to obtain a greater difference between the maximum and minimum speeds of the driven member in its cycle, it has been proposed to employ two such differential crank mechanisms connected in series, as for instance in Patents 1,115,090 and 2,067,513. In many cases, it is desirable to obtain a greater difference between maximum and minimum speeds of the driven member in its cycle than can be readily and satisfactorily obtained by the use of a pair of such differential crank mechanisms in series, or to obtain the same difference by a lesser extent of adjustment. In most types of machines where it is desirable to employ variable speed drives of the kind referred to, it is not commercially practical to mount more than two such differential crank mechanisms in substantial axial alignment and in series, or to connect more than two through gears as in Patent 2,059,412.

My present invention involves a novel construction and arrangement of parts whereby a plurality of differential crank mechanisms may be connected in series, but in extremely compact form without intermediate gears, with the minimum axial length, with the minimum number of supporting bearings in the frame, and with a single adjusting mechanism for all of the differential crank mechanisms, whereby all may be simultaneously adjusted and to the same extent. As the differential crank mechanisms are connected in series, the effect of the first is multiplied by that of each of the succeeding ones, and thus a very wide variation between maximum and minimum speeds of the driven member in its cycle may be obtained, and the extent of adjustment is very much lower for any given desired maximum and minimum speeds.

As one important feature, there are employed a plurality of coaxial laterally adjustable rotors, and at least three differential crank mechanisms for transmitting power to and from said rotors.

As another important feature, one of these rotors is journalled in and supported by another, so that only one frame or supporting bearing need be moved in making an adjustment.

Various other objects and features of the invention will be apparent from the following particular description, and from an inspection of the accompanying drawings, in which:

Fig. 1 is a section taken axially through a variable speed drive, provided with three differential crank mechanisms connected in series, and embodying one form of the present invention, Fig. 2 is a section taken on line 2—2 of Fig. 1, Fig. 3 is a section taken axially through a variable speed drive, provided with four differential crank mechanisms connected in series, and embodying another form of the present invention, and Fig. 4 is a section taken on line 4—4 of Fig. 3.

In the specific form of the invention shown in Figs. 1 and 2, the variable speed drive includes a power input or drive gear 10, which may be driven at uniform angular velocity, and a power output or driven shaft 11 driven from said gear at variable angular velocity, but with the same total time cycle. This driven shaft 11 may serve to drive the cutting cylinder 11a of a sheet cutting machine of the type above referred to. The drive gear 10 may be rigid or integral with shaft 12, and may be driven from a pinion 13 on a main drive shaft 14, journalled in a frame 15.

Between the drive gear 10 and the driven shaft 11, there is a plurality of rotors, connected in series through a plurality of differential crank mechanisms preferably of the crank and slide type, and each rotor is laterally adjustable in respect to the rotors from which and to which power is directly transmitted.

The first of the series of differential crank mechanisms includes a first rotor 12 and its drive gear 10, the latter having a radial slide groove 22 in one face thereof, so that it serves as an input crank slide. This slide transmits power to an output rotor 16, having a fixed axis in alignment with that of the driven shaft or rotor 11. This second rotor 16 has a crank shaft portion 17, journalled in bearings 18 in the frame 15, and a crank, shown as including a radial arm 19, carrying a crank pin 20, and a slide block 21. The slide block is disposed within the radial slot or groove 22 in the face of the gear 10. Thus the rotor 16 is driven from the rotor 12 and gear 10 at a variable angular velocity, which varies according to the eccentricity of the rotor 10, 12 in respect to the rotor 16.

The second differential crank mechanism transmits power from the second rotor 16 to a third rotor 24, and includes a radial crank slide 23, shown in the form of an arm on the shaft 17, diametrically opposite to the crank arm 19, and at the same end of said shaft. The rotor 24 has a hollow crank shaft portion 25, carrying a crank which includes a crank arm 26, having a crank pin 27 and slide block 28. The latter is disposed in the crank slide 23 of the rotor 16.

The rotor 16 may be in the form of a circular disc or wheel, supported on suitable bearings, and having the crank pin 20 and the crank slide 23 on one face thereof.

The crank shafts 12 and 25 are relatively rotatable and mounted co-axially one within the other. The crank shaft 25 is externally supported in bearings 31, and is of hollow construction to receive the shaft 12, and to form a bearing therefor. The shaft 25 may be formed of two sections bolted together. A split thrust collar 32 held between these two shaft sections holds the shaft 12 against axial displacement within the shaft 25.

To permit of the relative rotation or oscillation of the rotors 12 and 24, the gear wheel 10 has an arcuate slot 33 through which the crank 26 of the rotor 24 projects.

The power from the third rotor 24 is transmitted by a third differential crank mechanism to a fourth rotor 34, affixed to the driven shaft 11, and coaxial with the second rotor 16. This third mechanism includes a crank slide 36, on the opposite end of the crank shaft 25 from the crank arm 26, and extending diametrically opposite to said arm 26. The rotor 34 has a crank which includes a crank arm 37, carrying a crank pin 38, having a slide block 40 in the radial slot of the crank slide 36.

In order to reduce space consumption to a minimum, the frame 41 in which the shaft 11 is journalled may have a recess 42 to receive the rotor 34 and crank 37 substantially within the width of said frame.

It will be noted from the arrow A in Fig. 1, that power from the drive gear 10 is transmitted progressively through the three crank mechanisms in series to the driven shaft 11. In the position shown in Fig. 1, the axes of the four rotors 12, 16, 24 and 34 are coaxial, so that the shaft 11 is driven at a uniform angular velocity. In order to drive the shaft 11 at selective varying angular velocities, but at the same frequency of rotation as that of the drive gear 10, the relative eccentricity of the input and output rotors of each crank mechanism is adjusted. To permit of this adjustment, the bearings 31 for the rotor 24 may be supported in an arm 43, mounted for movement transversely to the fixed common axis of the two rotors 12 and 16. One end of the arm 43 is shown as provided with a collar 45, journalled on a sleeve 46, which is rigid with the frame 41, and which coaxially encircles the shaft 14. At the other end, the arm 43 is secured to an adjusting device such as a screw 47, which can be moved axially and held in adjusted position in any desired manner as for instance by a hand wheel 48, threaded on the screw, and held between stationary collars or frame members.

When the arm 43 is angularly moved about its pivot support 46, it swings the concentric rotors 12 and 24 out of axial alignment with respect to the fixed rotors 16 and 34 and to the desired extent. This eccentric setting of the crank mechanisms causes the output rotor of each crank mechanism to rotate at a varying speed ratio with respect to its input rotor during each rotation of said output rotor. Since the three crank mechanisms are connected in series, the resultant speed ratio of the driven shaft 11 with respect to the drive member 10 at any phase will be the product of the speed ratios of the individual crank mechanisms at that phase.

A simpler form of the construction shown in Figs. 1 and 2 may have only two differential crank mechanisms. In that event, the parts 36, 37, 38 and 40 may be omitted, and the rotor 24 without the slide 36 may encircle the rotor 34 and be journaled in the frame 41 with the gear 10 adjacent to said frame member. The member 15 would be omitted and the adjustable member 43 shifted over to replace the member 15 and support the rotor 16, so that the latter rotor would have its axis laterally adjustable, and the coaxial rotors corresponding to 24 and 12 would have fixed axes. The member 43 instead of being pivoted would be slidable as hereinafter referred to.

In Figs. 3 and 4 is shown a variable speed drive, similar in many respects to that shown in Figs. 1 and 2, but differing primarily in that the drive gear instead of being a part of the first rotor 12, encircles the fourth rotor 34, and is connected to the first rotor 12 by a differential crank mechanism. Thus, there are five rotors with four differential crank mechanisms, instead of four rotors and three differential crank mechanisms, and a greater range of angular velocity variation may be imparted to the driven shaft. Nevertheless, the parts are so arranged that the overall dimensions of the drive are not substantially increased.

In this form, the driving gear 10a is rigid with or forms a part of a fifth rotor 50, having a hollow shaft 51 mounted in the frame 41a, and encircling and rotatable in respect to the rotor 34a, which is keyed on the driven shaft 11b. The rotor 50 transmits power to a rotor 53, having a hollow shaft 54, and a crank arm 55 with its crank pin 56 provided with a slide block 57 disposed in a slide groove 58 of the gear wheel 10a.

The rotor 53 at the end opposite to the arm 55 has a slide crank arm 59, in the groove 60 of which is a slide block 61 on the crank pin 62 of the crank arm 63 of the next rotor 64, similar to the rotor 16 of the form shown in Figs. 1 and 2. This rotor 64 transmits power to the next rotor 65 through a slide arm 66, receiving the slide block 67 on the crank pin 68 carried by the crank arm 69 of said rotor 65.

The rotor 65 has a shaft portion 70, journaled in the hollow shaft 54, and at the end opposite to the crank arm 69 it has a slide arm 71, receiving the slide block 72 on the crank pin 73 of the crank arm 74 of the next rotor 34a. The path of power transmission is indicated by the arrow B.

All of the slide arms, crank arms, slide blocks and crank pins may be the same as shown in Figs. 1 and 2, and many of the rotors may be very similar. The outer rotor 53 of the two coaxial laterally movable rotors, which has a crank arm on one end and a crank slide arm on the other, may be made of two sections bolted together as is the rotor 24, and since the inner rotor 65 also has a crank arm on one end and a crank slide arm on the other, it also is preferably made of two sections, bolted together, this sectional construction not being necessary for the inner rotor 12 of Figs. 1 and 2.

As the drive gear 10a is rotatable about a fixed axis instead of a movable one, it is not necessary that the bearing for the two laterally movable rotors be pivoted to swing about the axis of a driving pinion. As shown, the bearing 76 of the outer rotor 53 may slide in suitable supports 77, and may be moved and locked in position by a hand wheel 48a between collars or frame parts and on a threaded rod 47a, which is rigid with the bearing block 76.

With four differential crank mechanisms, there is a greater difference in angular velocity in a single rotation than there is in the case with only three such mechanisms, and a given difference may be obtained by a lesser extent of adjustment of the laterally movable rotors.

Both of the variable speed drives shown are so arranged and constructed as to reduce to a minimum the number of parts, and in both a single gear is utilized in the entire transmission for the input of power. The gear might be replaced by any other suitable type of power transmitting element such as a sprocket wheel, pulley or the like.

Furthermore, the differential crank mechanisms are so compactly arranged as to occupy a minimum amount of space, and reduce to a minimum the distance between the input and output members of the drive, so that vibrations are correspondingly reduced.

Furthermore, the arrangement is such as to simplify the adjusting means. Only two rotors are laterally adjustable to effect changes in the speed ratio of each of the crank mechanisms, whether there be three crank mechanisms as in Figs. 1 and 2 or four crank mechanisms as in Figs. 3 and 4, and in both cases there is only one movable frame bearing, as the two adjustable rotors are mounted one inside of the other.

As many changes could be made in the above construction, and many different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent is:

1. A variable speed drive including a pair of coaxial relatively rotatable rotors, means for adjusting said rotors in a direction at an angle to their common axis, a third rotor, separate differential crank mechanisms connecting said third rotor to each of said pair of rotors, and a fourth rotor having a differential crank connection to one of said pair.

2. A variable speed drive including a pair of coaxial relatively rotatable rotors, means for adjusting said rotors in a direction at an angle to their common axis, a third rotor, separate differential crank mechanisms connecting said third rotor to each of said pair of rotors, a fourth rotor having a differential crank connection to one of said pair, and separate driving and driven members, one connected to the other of said pair, and the other connected to said fourth rotor.

3. A variable speed drive including a pair of coaxial relatively rotatable rotors, means for adjusting said rotors in a direction at an angle to their common axis, a third rotor, separate differential crank mechanisms connecting said third rotor to each of said pair of rotors, a fourth rotor having a differential crank connection to one of said pair, and separate driving and driven members, one connected by a differential crank mechanism to the other of said pair, and the other connected to said fourth rotor.

4. A variable speed drive including a pair of coaxial relatively rotatable rotors, means for laterally adjusting the axis of said rotors, a pair of rotors having a common fixed axis, a pair of differential crank mechanisms connecting one of said second pair to each of said first pair, and a third differential crank mechanism connecting the other of said second pair to one of said first pair.

5. A variable speed drive including three rotors having a common fixed axis, a pair of coaxial, relatively rotatable rotors, means for adjusting the axis of said pair of rotors laterally in respect to said fixed axis, one mounted within the other, and four differential crank mechanisms connecting said rotors together in series, one of said first-mentioned rotors constituting a driving member, another of said first-mentioned rotors constituting a driven member, and the third of said first-mentioned rotors being connected between said pair of adjustable rotors.

6. A variable speed drive including a plurality of differential crank mechanisms connected in series, and each including a crank pin and a slide coacting therewith, a pair of coaxial relatively rotatable members, one supporting the crank pin of one of said crank mechanisms, and the other supporting the slide of another of said crank mechanisms, a rotor having a crank engaging said slide, and a slide engaging said first mentioned crank, and means for moving the axis of said members laterally in respect to the axis of said rotor.

7. A variable speed drive including a pair of coaxial relatively rotatable rotors, one having a crank and the other having a slide, a support therefor, a third rotor having a slide engaging said crank, and a crank engaging said first-mentioned slide, a support therefor, means for moving one of said supports laterally in respect to the other, means for driving one of said pair of rotors, and means driven by the other rotor of the pair.

8. A variable speed drive including a pair of relatively rotatable rotors, one journaled within the other, one constituting a driving member and the other a driven member, one having a crank and the other having a slide, a third rotor having a slide engaging said crank and a crank engaging said first-mentioned slide, and means for effecting relative lateral adjustment of the axes of the pair and third rotors.

9. A variable speed drive including a pair of coaxial relatively rotatable rotors, means for adjusting said rotors in a direction at an angle to their common axis, one having a crank and the other having a slide, a third rotor mounted on a fixed axis, and having a slide engaging said crank and a crank engaging said first-mentioned slide, means for driving one of said rotors, and means driven by the other rotor, each of said means including a differential crank mechanism.

10. A variable speed drive, including three differential crank mechanisms connected in series, each including a crank and a slide, two of said cranks and one slide having a common axis, and the other two slides and the other crank having a common axis, and means for laterally adjusting one of said axes in respect to the other.

11. A variable speed drive including four rotors, one having a crank, another having a slide, and each of the other two having both a crank and a slide, each crank engaging the slide of another rotor to form a differential crank mechanism, two of said rotors being coaxial and relatively rotatable means for laterally adjusting the axis of said last mentioned rotors, and the other two being relatively rotatable about a common fixed axis.

12. A variable speed drive including four rotors, one having a crank, another having a slide, and each of the other two having both a crank and a slide, each crank engaging the slide of another rotor to form a differential crank mechanism, two of said rotors being coaxial and relatively rotatable means for laterally adjusting the axis of said last mentioned rotors, and the other two being relatively rotatable about a common fixed axis, one of said laterally adjustable rotors being rotatably mounted in and supported by the other.

13. A variable speed drive comprising a first differential crank mechanism having a first input power rotor, a second output power rotor mounted end to end with respect to said first rotor, and a crank pin slide connection between the adjacent ends of said rotors, a second differential crank mechanism in series with said first crank mechanism, and including said second rotor as the input rotor, and a third output power rotor extending end to end with respect to said second rotor, and at the same end of said second rotor as said first rotor, and a second crank pin slide connection between the adjacent ends of said second rotor and said third rotor, and means for simultaneously adjusting the eccentricity of the input and output power members of all of said crank mechanisms to effect adjustments in the speed ratio of each of said crank mechanisms.

14. A variable speed drive comprising a pair of differential crank mechanisms connected in series, and including a rotor, a pair of relatively rotatable coaxial rotors mounted on one side of said first rotor, a crank pin slide connection between one of said coaxial rotors and said first rotor for driving said first rotor, and a crank pin slide connection between said first rotor and the other of said coaxial rotors for driving said latter rotor.

15. A variable speed drive including a plurality of differential crank mechanisms connected in series and having a power input gear, a pair of rotors on opposite sides of said gear, one of said rotors being mounted coaxial with said gear and the other rotor having its axis parallel to the axis of the gear, means for adjusting the axis of said last mentioned rotor laterally in respect to the gear axis, one of said rotors having a crank pin and slide connection to said gear, and a separate crank pin and slide connection between said rotors and extending through said gear.

16. A variable speed drive, including a hollow shaft, a gear coaxial therewith, relatively rotatable in respect thereto and having an opening therethrough, a rotor having its axis parallel to the common axis of said shaft and gear, a crank pin and slide connection between said gear and said rotor, a crank pin and slide connection between said rotor and said shaft, and extending through said opening of said gear, and means for adjusting one of said axes radially in respect to the other.

17. A power transmitting mechanism, including a driving member, a driven member extending therethrough and coaxial therewith, a rotor spaced from said members and having its axis in alignment with the axis of said driving and driven members, a pair of coaxial rotors disposed between said members and said first mentioned rotor, means for adjusting the axis of said pair of rotors radially in respect to the common axis of said members and said first mentioned rotor, and four crank pin and slide connections, one between said driving member and one of said pair of rotors, the second between said last mentioned rotor and the first mentioned one, the third between said first mentioned rotor and the other one of said pair, and the fourth between said last mentioned rotor and said driven member, whereby all of said crank pin and slide connections are adjusted by the lateral movement of said pair of rotors.

18. A variable speed drive comprising a pair of coaxial rotors, one rotatably supported within the other, a second pair of rotors mounted on a fixed center, a plurality of differential crank mechanisms connecting all four of said rotors in series, and means for laterally adjusting the axis of said first pair.

KARL SIEG.